United States Patent [19]

Lewis et al.

[11] 3,985,375

[45] Oct. 12, 1976

[54] INFLATION APPARATUS

[75] Inventors: Donald J. Lewis, Troy; Brian K. Hamilton, Utica, both of Mich.

[73] Assignee: Allied Chemical Corporation, Morris Township, N.J.

[22] Filed: May 11, 1972

[21] Appl. No.: 252,184

[52] U.S. Cl. .............................. 280/737; 280/741; 280/742; 280/735; 222/3
[51] Int. Cl.² ........................................ B60R 21/10
[58] Field of Search .......... 280/150 AB, 737, 741, 280/742; 102/39; 23/281; 138/45, 46; 222/3; 141/4; 60/254

[56] References Cited
UNITED STATES PATENTS

| | | | |
|---|---|---|---|
| 2,934,094 | 4/1960 | Szydlowski | 138/46 |
| 2,968,919 | 1/1961 | Hughes et al. | 138/45 X |
| 3,167,912 | 2/1965 | Ledwith | 60/254 X |
| 3,332,432 | 7/1967 | Marsh | 137/68 |
| 3,532,359 | 10/1970 | Teague et al. | 280/150 AB |
| 3,643,971 | 2/1972 | Kushnick | 280/150 AB |
| 3,674,059 | 7/1972 | Stephenson | 280/150 AB |
| 3,684,309 | 8/1972 | Uchiyamada et al. | 280/150 AB |
| 3,713,667 | 1/1973 | Blanchard | 280/150 AB |
| 3,715,131 | 2/1973 | Hurley | 280/150 AB |
| 3,758,131 | 9/1973 | Stephenson | 280/150 AB |

*Primary Examiner*—Kenneth H. Betts
*Attorney, Agent, or Firm*—Jonathan Plaut; Ernest D. Buff

[57] ABSTRACT

Apparatus for variably controlling the burn time of a fixed amount of gas generating material used for inflating purposes. Gas developed by combustion of the gas generating material passes through a conduit. A blocking means is provided which, when selectively disposed in the conduit, decreases the cross-sectional area thereof and partially blocks the flow of the generated gas therethrough. The burn time of the gas generating material then decreases and the mass flow rate of the generated gas through the conduit is increased. The apparatus is especially adapted for use with motor vehicle passive restraint systems wherein, upon impact of the vehicle, a bag is rapidly inflated by the gas to protect passengers or other mobile objects of the vehicle.

17 Claims, 2 Drawing Figures

INFLATION APPARATUS

BACKGROUND OF THE INVENTION

1. Field of the Invention

This invention relates to the generation of gas, and more particularly to apparatus for variably generating a gas used for inflating purposes. Such apparatus is especially adapted for use with motor vehicle passive restraint systems wherein, upon impact of the vehicle, a bag is rapidly inflated by the gas to protect passengers or other mobile objects of the vehicle.

2. Description of the Prior Art

In the gas generating apparatus conventionally used for inflation purposes, a gas developed by combustion of a gas generating material is directed through a conduit into an inflatable device. The gas generating material burns during a constant time interval. As a result, the time interval during which the inflatable device is filled with the generated gas remains relatively constant. For certain inflation applications, such as the inflation of air bags used in motor vehicle passive restraint systems, it is desirable to variably control the inflation time interval. However, in gas generating apparatus of the type described, the cross-sectional area of the conduit and the burn time for a fixed quantity of gas generating material have been considered constant parameters. Thus, in order to variably control the inflation time interval, it has previously been necessary either to employ a hybrid system wherein a pressurized gas is variably admixed with gas generating from a fixed amount of gas generatng material, or to employ inflation systems capable of providing a variable amount of generated gas.

In use of the hybrid system, damage to the inflatable device can occur if the pressure and temperature of the hybrid gas are not carefully controlled. Unless the generated gas is cooled by contact with a sufficient amount of the pressurized gas, it may be hot enough to damage the inflatable device. In order to safely regulate the pressure and temperature of the hybrid gas, a system of relatively complex and expensive electromechanical components has previously been required. Inflation systems which vary the amount generated gas are even more expensive. As a result, the inflation time interval cannot be variably controlled in an economical manner.

SUMMARY OF THE INVENTION

The present invention provides an economical apparatus for variably controlling the burn time of a fixed amount of gas generating material used for inflating purposes. An actuating means connected to gas generating material within a gas generating means ignites the gas generating material upon receipt of a firing command. Gas developed by combustion of the gas generating material passes through a conduit in the gas generating means and into an inflatable device. A blocking means is provided which, when selectively disposed in the conduit, decreases the cross-sectional area thereof and partially blocks the flow of the generated gas therethrough.

It has been found that by decreasing the cross-sectional area of the conduit in this manner, the mass flow rate of the generated gas is, surprisingly, increased. The burn time of the gas generating material decreases and the inflation time interval is reduced. As used in this paragraph and whenever used hereinafter in the specification and claims, the term "mass flow rate"[is intended to refer to the total weight of a given volume of gas passing through the conduit during a given interval of time.

In a specific embodiment, the apparatus is adapted to be disposed within a motor vehicle subject to impact for inflating a bag with gas generated during a variably controlled time interval. The apparatus includes a power source for supplying an electrical signal and a gas source comprising a gas containing means provided with a pressurized gas and a gas generating means provided with a gas generating material. The gas generating means is connected to an actuating means for igniting the gas generating material upon receipt of the electrical signal. A conduit in communication with the gas generating means and the gas containing means permits gas developed by combustion of the gas generating material to flow into the gas containing means. The gas containing means is connected to a gas releasing means for permitting the pressurized gas and the generated gas to flow into the bag upon receipt of the electrical signal. An impact detector responsive to impact of the vehicle causes the electrical signal to pass to the actuating means and the gas releasing means. A blocking means is movably mounted adjacent the conduit. A displacing means is provided for selectively displacing the blocking means into the conduit. Each of the impact detector and the displacing means is differently responsive to the impact velocity. Upon displacement, the blocking means decreases the cross-sectional area of the conduit and partially blocks the flow of the generated gas therethrough. The burn time of the gas generating material decreases and generated gas flows through the conduit at a faster rate. The inflation time interval is thereby decreased and the bag is more rapidly disposed between hard portions of the vehicle and passengers and other mobile objects contained therein.

The apparatus of this invention has advantgeous structural features. In use of a hybrid gas the variable burn rate permits a better distribution of the generated and pressurized gases. The temperature and pressure of the hybrid gas are easily and safely controlled by simple electrical systems which are relatively inexpensive. Hence, a greater control of the mass flow rate and the inflation time interval is economically obtained.

BRIEF DESCRIPTION OF THE DRAWINGS

The invention will be more fully understood and further advantages will become apparent when reference is made to the following detailed description of the preferred embodiments of the invention and the accompanying drawings in which.

DESCRIPTION OF THE PREFERRED EMBODIMENTS

The gas generating apparatus of the present invention may be fabricated in a number of relatively simple configurations. As a consequence, the invention will be found to function with most types of inflation apparatus. For illustrative purposes the invention is described in connection with a hybrid gas source having a gas containing portion provided with a pressurized gas and a gas generating portion provided with a gas generating material. Such apparatus is especially adapted for use with motor vehicle passive restraint systems wherein, upon impact of the vehicle, a bag is rapidly inflated by the gas to protect passengers or other mobile objects of the vehicle. The inflating medium can, of course, consist solely of a generated gas. Moreover, it will be readily appreciated that the invention can be employed for similar and yet diversified uses, such as to (1) vary the inflation time interval of life rafts, aircraft escape slides, ballons and other similar devices which are inflated to a constant pressure, (2) controllably erect inflatable structures such as space craft antennae, and (3) variably displace non-inflatable structures, as in the opening of silo doors for underground missile launchers.

Figure 1:
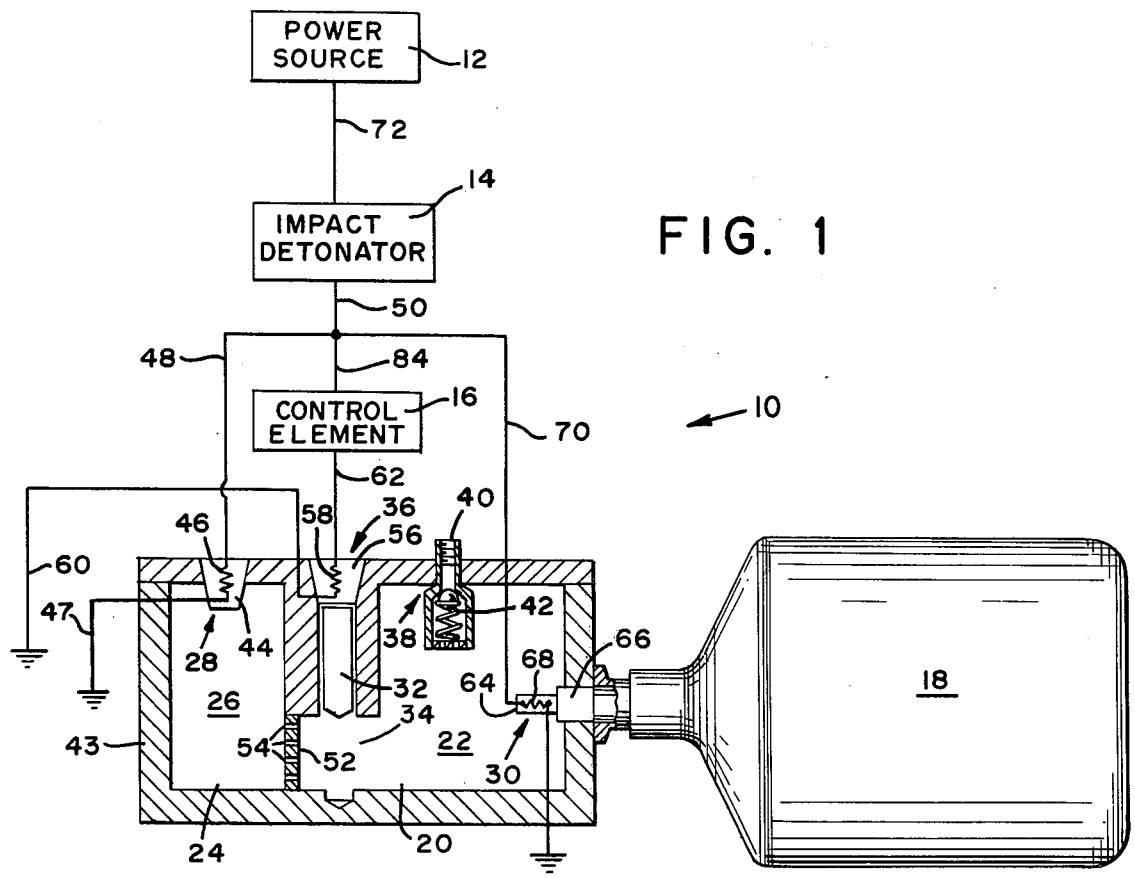
FIG. 1 is a diagrammatic representation of apparatus for variably delivering gas into an inflatable bag including, schematically, a power source, an impact detector and a control means.

Referring to FIG. 1 of the drawings, the apparatus, shown generally at 10 includes a power source 12, an impact detector 14, a control element 16 and a plurality of gas producing components connected to an inflatable bag 18. The power source 12 may comprise a battery of the type conventionally used in a motor vehicle. An auxiliary power supply, such as a capacitor (not shown) connected in parallel to the battery, may be used as the power source in the event that the battery is not supplying power to the system. The gas producing components include a gas source having a gas containing means 20 filled with a pressurized gas 22 and a gas generating means 24 provided with a gas generating material 26, an actuating means, generally indicated at 28, for initiating the generation of gas within the gas generating means 24 and a gas releasing means, generally indicated at 30, for releasing gas from the gas containing means 20. A blocking means 32 is movably mounted adjacent a conduit 34 which is located between the gas containing means 20 and the gas generating means 24 so as to place the gas containing means 20 in communication with the gas generating means 24. Displacing means are provided which may include an electroexplosive means generally indicated at 36 and the control element 16. The electroexplosive means 36 are structurally connected to the blocking means 32 and electrically connected to the control element 16. The impact detector 14 and the control element 16 each have means which are differently responsive to impact of a vehicle in whch the apparatus 10 is disposed. A firing command in the form of an electrical signal supplied by the power source 12 is directed to the actuating means 28 and to the gas releasing means 30 by the impact detector 14 upon impact of the vehicle. The gas releasing means 30 provide an orifice (not shown) in the gas containing means 20 which places the gas containing means 20 in communication with the interior portion of the inflatable bag 18. Gas discharged from the gas generating means 24 and the gas containing means 20 upon receipt of the electrical signal commences to flow into the bag 18. The electrical signal is selectively transmitted from the control element 16 to the electroexplosive means 36. If the impact velocity exceeds a predetermined value, the electroexplosive means 36 is ignited. The blocking means 32 is displaced into the conduit 34, so as to decrease the cross-sectional area of the conduit and partially block the flow of the generated gas therethough. Suprisingly, the mass flow rate of the generated gas increases. The inflation time interval in decreased, and the bag is more rapidly disposed between hard portions of the vehicle and passengers or other mobile objects contained theren.

The gas containing means 20 includes a gas inlet means, shown generally at 38. Preferably, the gas inlet means 38 comprises a tapped hole 40 which communicates with a source of pressurized gas (not shown) and a check valve 42. Th use of the check valve 42 is preferred in order to prevent backflow of the pressurized gas 22. In FIG. 1, the gas inlet means 38 is shown disposed at the downstream end of the gas containing means 20. It should be appreciated that this position of the inlet means 38 is optional and that in other embodiments the location of the inlet means 38 may be in other positions on the gas containing means 20. The gas containing means 20 is filled by injecting a pressurized gas 22 through the gas inlet means 38 until a preselected pressure is attained within the gas containing means 20. Nitrogen, argon, air or other suitable gas which is not toxic to humans, does not have a deleterious effect on the inflatable bag 18, and can be stored for prolonged periods without leaking from the gas containing means 20 is generally used as the pressurized gas. The gas containing means, in one embodiment, has a volume in the range of about 20 to 160 cubic inches, and preferably about 100 cubic inches. The pressurized gas is normally contained within the gas containing means 20 at a pressure in the range of about 1000 to about 3000 pounds per square inch, and preferably at about 2000 pounds per square inch. Pressures exerted within the gas containing means 20 by admixture of the stored and generated gases may increase the pressure in the gas containing means 20 to a pressure in the range of abut 3000 to 5000 psi or more.

Because of the pressures which are maintained within the gas generating means 24, the latter is provided with a relatively thick housing 43. The thickness of the housing 43 is designed to insure the structural integrity thereof if the housing 43 is subjected to pressures in excess of those anticipated. Preferably, the housing is constructed of steel or other suitable metal.

The gas generating means 24 contains the actuating means 28, including a squib 44. The squib 44 is structurally connected to a resistance element, such as a bridge wire 46, which will produce a suitable volume resistivity to heat and ignite the squib 44 upon passage of an electrical current therethough. The bridge wire 44 is ground by line 47, and is electrically connected via lines 48 and 50 to an impact detector 14, which selectively connects the bridge wire 46 and electrical power source 12 upon impact of a vehicle in which the apparatus 10 is disposed. The gas generating means 24 is provided with the gas generating material 26 disposed adjacent to the squib 44. Black powder, nitrocellulose, composite propellant such as ammonium perchlorate and polyvinyl chloride, or other material which generates gas and heat upon combustion can be used as the gas generating material.

The volume and pressure of the pressurized gas 22 selected will depend upon the volume of the inflatable bag 18, and the pressure and volume of gas produced by the gas generating material 26. Preferably, the pressure and volume of the presssurized gas 22 is at least about 25 percent of the volume of and pressure of gas generated by combustion of the gas generating material 26. The volume of gas stored within the gas containing means 20 can be varied in order to maximize the high pressure gas potential and minimize the volume of the gas source. Thus, the inflating gas can consist solely of gas generated from a single gas generating charge. Alternatively, a second gas generating means (not shown) can be substituted for the gas containing means 20. Preferably, a hybrid combination of pressurized gas and gas generating materials is employed in which the pressurized gas 22 is stored within the gas containing means 20 at sufficient pressure and volume to substantially fill the bag.

The gas containing means 20, which contains gas stored under pressure, and the gas generating means 24, which includes the combustible gas generating material 26 respectively represent separate compartments of a pressurized tank. Means are provided for permitting gas developed by combustion of the gas generating material 26 to flow into the gas containing means 20. Such means may comprise a conduit 34 associated with the respective compartments. The conduit 34 is located between the compartments. It may have a variety of forms, including bent, unbent, annular and polygonal configurations. Preferably, the conduit 34 has a relatively short longitudinal dimension and is substantially straight and unbent so as to provide for an efficient flow of generated gas into the gas containing means 20. A diffuser 52 is disposed within the conduit 34 at the downstream end of the gas generating means 24. The diffuser 52 contains a plurality of passageways 54 which cause gas generated by combustion of the gas generating material 26 to move into the upstream end of the conduit 34 at a uniform pressure and velocity.

The blocking means 32 is movably mounted adjacent to the conduit 34. Such means may include a cylindrically shaped pin frictionally secured in a stationary position within the housing 43. The mounting may be the pivotal variety, and other forms of blocking means, such as slidably or pivotally mounted partitions which are solid or partially porous structures and have annular or polygonal exterior surfaces can be used. The blocking means 32 shown in FIG. 1 is intended to be illustrative and should not be interpreted to limit the scope of the invention to the particular structure disclosed. Accordingly, the term "blocking means" as used in the specification and claims with reference to the gas generating apparatus is intended to include, as well, configurations of the type discussed in this paragraph.

The electroexplosive means 36 include a displacing squib 56 which has a resistance element, such as a bridge wire 58 connected thereto. Bridge wire 58 is grounded by line 60 and is electrically connected to the control element 16 via line 62. Displacing squib 56 can be located within the housing 43 adjacent the upper end 62 of the blocking means 32 so that upon explosion of the displacing squib 56 the blocking means is displaced into and decreases the cross-sectional area of the conduit 34.

In order to provide for the release of gas from the gas containing means 20, an explosive charge, such as a detonator 64 is located adjacent to an outlet plug 66. The plug 66 separates the interior portion of the bag 18 from the pressurized gas 22. Detonator 64 is structurally connected to a resistance element, such as a bridge wire 68. The bridge wire 68 is electrically connected through lines 70 and 50 to line 72 and power source 12 by impact detector 14 upon impact of the vehicle.

Figure 2:
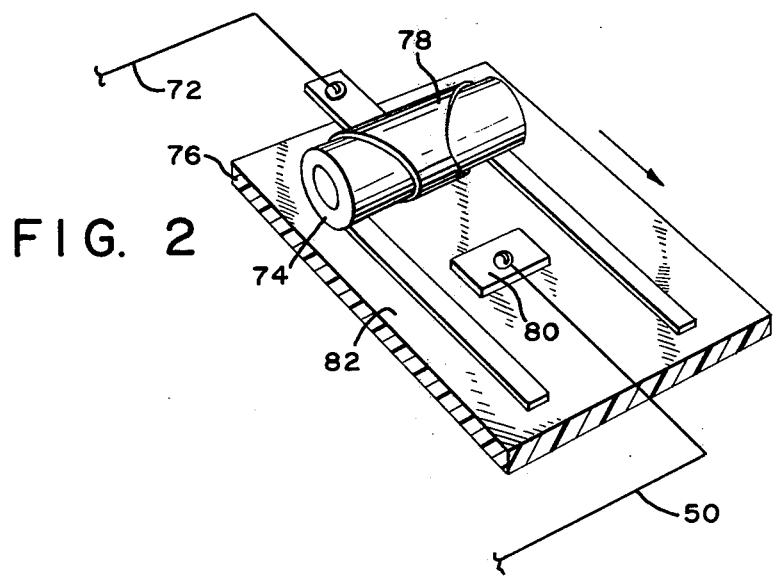
FIG. 2 is an isometric view of one form of the impact detector shown in FIG. 1.

In FIG. 2 there is illustrated one form of an impact detecting means. Other forms of impact detecting means can also be used. The impact detecting means shown in FIG. 2 should therefore be interpreted as illustrative and not in a limiting sense. Such means amy comprise at least one roller 74 of metal such as stainless steel, gold plated copper, or other suitable conductive material. The roller 74 is electrically connected via line 72 to the power source 12 and movably mounted on a non-conductive support 76 made, for example, of polycarbonate. A thin band of electrically conductive material 78, such as stainless steel, gold plated copper or the like, wrapped around roller 74 and spot welded or otherwise secured to support 76, provides a resisting force, hereinafter referred to as the first resisting force, against which the roller 74 acts. Conductive element 80, comprised of electroconductive material of the type used to make band 78 is fixedly mounted on support 76. If roller 74 is displaced along the surface 82 of support 76 in the direction of the arrow, band 78 is brought into contact with the conductive element 80. An electrical signal is transmitted from the power source 12 through line 72, the impact detector lines 50, 48 and 70 to the gas producing components.

The control element 16 is electrically connected to the impact detector via lines 84 and 50, and to the electroexplosive means via line 62. Such control element is contructed and operated in substantially the same manner as the impact detector 14, with the exception that the resisting force against which its roller acts, hereinafter referred to as the second resisting force, is of greater magnitude than the first resisting force. Accordingly, the impact detector 14 and the control element 16 are differently responsive to the impact velocity.

It will be understood that the impact detector 14 is responsive to a wider range of impact velocities than the control element 16. Thus, impact velocities resulting in generation and release of the inflating gas may have insufficient magnitude to result in ignition of the electroexplosive means 36. At such velocities, the electroexplosive means 36 do not cause the blocking means 32 to be disposed within conduit 34 and the bag inflates during a relatively longer time interval. When impact velocity is high enough to generate forces greater in magnitude than the second preselected resisting force, the electrical signal is transmitted from power source 12 to the gas producing components by impact detector 14 and, in addition, through line 84, control element 16 and line 62 to the electroexplosive means 36. Generated and pressurized gas commence to flow into the inflatable bag and the electroexplosive means 36 are ignited. The blocking means 32 is slidably displaced into the conduit 34 so as to decrease the cross-sectional area thereof an partially block the flow of the generated gas therethrough. Due to the decreased cross-sectional area of the conduit, the pressure and temperature within the gas generating means rapidly increases. The burn time decreases and the mass flow rate of generated gas through the conduit is markedly increased. Due to the presence of the blocking means 20 within conduit 34, the pressurized gas 22 within the gas containing means 20 is (1) contacted by a greater quantity of the generated gas and (2) heated to a higher temperature. The generated and pressurized gases flow into the bag 18 at a faster rate, and the inflation time interval is reduced.

The extent to which the burn time of a gas generating material can be decreased and the mass flow rate of the generated gas increased depends upon the type, density and quantity of gas generating material 26, the cross-sectional area of the orifice and the blocking capacity of the blocking means 32. Such blocking capacity on both the size and the shape of the blocking means 32. Generally, the blocking means 32 should have a blocking capacity capable of reducing the cross-sectional area of the conduit 34 by from about 10 to 75 percent, preferably from about 20 to 50 percent.

A unique means is thereby provided for varying the inflation time interval of the bag 18 in proportion to the impact velocity of the vehicle. Such means provide increased control over the amount of heat generated by combustion of the gas generating material 26.

Inasmuch as ignition of the electroexplosive means 36 occurs simultaneously with generation and release of the gas, the amount of pressurized gas 22 available within the gas containing means 20 is always sufficient to adequately cool the generated gas. Thus, the temperature and pressure of the hybrid gas is easily and safely controlled by simple electrical systems which are relatively inexpensive. A better distribution of the generated and pressurized gases is permitted, and an increased control of the mass flow rate and the inflation time interval is economically obtained. As long as the gas source includes means for selectively blocking the flow of the generated gas, the bag 18 can be inflated during a controlled time interval which varies inversely with the impact velocity. The apparatus thus provides increased protection to occupants or other mobile objects of the vehicle when collision occurs at velocities ranging from about 20 to 50 miles per hour.

In operation, in the embodiment disclosed, forces resulting from impact of a vehicle in which the apparatus 10 is disposed displace roller 74 against the first preselected resisting force and along the surface 82 of support 76 until band 78 is brought into contact with conductive element 80 giving a firing command. Such command, in the form of an electrical signal, is transmitted from the power source 12 through line 72, impact detector 14 and lines 50, 48 and 70 to the gas producing components. Bridge wire 68 heats and detonates the detonator 64 upon receipt of the electrical signal. Such detonation dislodges plug 66, whereupon an orifice (not shown) is created in communication with the gas containing means 20 and the interior portion of the inflatable bag 18. Squib 44 of actuating means 28 is heated and ignited by the bridge wire 46 upon receipt of the electrical signal. The squib 44 ignites the gas generating material 26 and production of the generated gas commences. Gas developed by combustion of the gas generating material 26 flows through the diffuser 52 and the conduit 34 into the gas containing means 20. The combined pressurized and generated gases then pass into the inflatable bag 18.

If forces resulting from impact of the vehicle are greater in magnitude than the second preselected resisting force, the electrical signal is transmitted through line 84, control element 16 and line 62 to the bridge wire 58. The bridge wire 58 heats and ignites displacing squib 56, whereby the blocking means 32 is displaced into the conduit 34 so as to decrease the cross-sectional area thereof and partially block the flow of the generated gas therethrough. The pressure and temperature within the gas generating means 24 increase, and generated gas flows through the conduit at a faster rate. The inflation time interval is decreased, and the bag is more rapidly disposed between hard portions of the vehicle and passengers and other mobile objects contained therein.

The apparatus 10 which has been disclosed herein can, of course, be modified in numerous ways without departing from the scope of the invention. Although the invention has been described with reference to apparatus for releasing gas from a single gas source upon a single vehicular impact, it is intended that the invention can be used with apparatus for successively inflating a bag with gas from a plurality of gas sources when multiple impacts occur within a short period of time. In such apparatus, an electrical signal can be transmitted from a power source through a circuit means to a primary gas source upon a first impact of the vehicle and to a secondary gas source upon a subsequent impact. A pressure sensitive control means electrically connected to the circuit means and responsive to the pressure of gas within the primary gas source electrically connects the primary gas source to the circuit means prior to an impact of the vehicle and electrically connects the secondary gas source to the circuit means after the impact. The bag is successively inflated and reinflated upon a first and second impact of the vehicle by gas sequentially released from the primary and secondary gas source upon receipt of the electrical signal. Moreover, for one or more gas sources, the invention as described herein can additionally be used with apparatus in which the electrical signal is transmitted from a power source through a first circuit means to the gas releasing means 30 and the actuating means 28 during a fixed time interval, and through a second circuit means to the electroexplosive means 36 during a variable time interval of at least the same duration as the fixed time interval; but wherein the variable time interval is (1) inversely proportional to the impact velocity of the vehicle and/or (2) directly proportional to the ambient temperature of the portion of the vehicle in which the apparatus 10 is disposed. The construction and operation of apparatus for successively inflating a bag with gas from a plurality of gas sources when multiple impacts occur, for inflating the bag during a time interval which varies in inverse proportion to the impact velocity of the vehicle and for inflating the bag during a time interval which varies in direct proportion to the said ambient temperature, is respectively disclosed in the copending applications of Donald G. Radke et al., Ser. No. 192,971, (now U.S. Pat. No. 3,868,126) and Donald J. Lewis, Ser. Nos. 192,850 (now U.S. Pat. No. 3,922,001) and 192,916, (now U.S. Pat. No. 3,767,228) filed Oct. 27, 1971, which disclosures are specifically incorporated by reference.

Having thus described the invention in rather full detail, it will be understood that these details need not be strictly adhered to but that various changes and modifications may suggest themselves to one skilled in the art, all falling within the scope of the invention as defined by the subjoined claims.

We claim:
1. Apparatus for variably controlling the burn time of a fixed amount of gas generating material used for inflation purposes, comprising:
  a. gas generating means provided with a gas generating material and having a conduit therein;
  b. actuating means connected to said gas generating means for igniting said gas generating material upon receipt of a firing command, whereby generated gas flows through said conduit;
  c. an impact detector responsive to impact velocities of the vehicle greater than a first, predetermined lower value for transmitting the firing command to said actuating means;

d. blocking means movably mounted adjacent said conduit; and e. displacing means responsive to impact velocities of said vehicle greater than a second, predetermined higher value for selectively displacing said blocking means into said conduit so as to decrease the cross-sectional area thereof and partially block the flow of generated gas therethrough, whereby the burn time of the gas generating material is decreased and the mass flow rate of said generated gas through said conduit is increased.

2. Apparatus as recited in claim 1, including a power source for supplying an electrical signal, said blocking means being movably mounted adjacent said conduit and being connected to a displacing means for displacing said blocking means into said conduit upon receipt of said signal.

3. Apparatus as recited in claim 2 wherein said blocking means has a blocking capacity capable of reducing the cross-sectional area of said conduit by from about 10 to 75 percent.

4. Apparatus as recited in claim 3, wherein said gas generating means includes a housing, and said blocking means is a cylindrically shaped pin frictionally secured in the housing.

5. Apparatus as recited in claim 4, wherein the pin has a polygonal exterior surface.

6. Apparatus adapted to be disposed within a motor vehicle subject to impact for inflating a bag with gas generated during a variably controlled time interval, comprising:

a. a power source for supplying an electrical signal;
b. gas containing means provided with a pressurized gas;
c. gas generating means provided with a gas generating material;
d. actuating means connected to said gas generating material for igniting said gas generating material upon receipt of said electrical signal;
e. a conduit in communication with said gas generating means and said gas containing means for permitting gas developed by combustion of said gas generating material to flow into said gas containing means; f. gas releasing means connected to said gas containing means for permitting said pressurized gas and said generated gas to flow into said bag upon receipt of said electrical signal;
g. an impact detector responsive to impact velocities of said vehicle greater than a first, predetermined lower value for causing the electrical signal to pass to said actuating means and said gas releasing means;
h. blocking means movably mounted adjacent said conduit; and
i. displacing means responsive to impact velocities of the vehicle greater than a second, predetermined higher value for selectively displacing said blocking means into said conduit so as to decrease the cross-sectional area thereof and partially block the flow of generated gas therethrough, whereby the burn time of the gas generating material is decreased and the mass flow rate of said generated gas through said conduit is increased.

7. Apparatus as recited in claim 6, wherein said displacing means includes a control element and an electroexplosive means which is structurally connected to said control element.

8. Apparatus as recited in claim 7, wherein said impact detector comprises a movable electroconductive material and means for displacing said material against a preselected resisting force and into contact with an electroconductive element electrically connected to said actuating means and said gas releasing means.

9. Apparatus as recited in claim 8, wherein said control element comprises a movable electroconductive material electrically connected to said impact detector and means for displacing said material against a preselected resisting force and into contact with an electroconductive element electrically connected to said electroexplosive means.

10. Apparatus as recited in claim 9, wherein said electroconductive material of said control element is displaced against a preselected resisting force having a magnitude greater than the magnitude of said preselected resisting force against which said impact detector is displaced.

11. Apparatus as recited in claim 10, wherein said gas containing and generating means are enclosed within a housing, and said gas releasing means comprises a plug removably mounted in said housing, said plug extending through a full thickness of said housing and into contact with said pressurized gas, a detonator located adjacent to the plug, and a bridge wire structurally connected to said detonator and electrically connected to said impact detector for detonating the detonator upon passage of said electrical signal through the bridge wire, whereby the plug is removed from the housing.

12. Apparatus as recited in claim 11 wherein the actuating means comprises a squib disposed adjacent to the gas generating material and a bridge wire structurally connected to the squib and electrically connected to the impact detector for igniting the squib upon receipt of the electrical signal, whereby the squib ignites the gas generating material.

13. Apparatus as recited in claim 12, wherein said blocking means having a blocking capacity capable of reducing the cross-sectional area of said conduit by from about 10 to about 75 percent.

14. Apparatus as recited in claim 13, wherein said blocking means is a cylindrically shaped pin frictionally secured in said housing.

15. Apparatus as recited in claim 14, wherein the pin has a polygonal exterior surface.

16. In an apparatus adapted to be disposed within a motor vehicle subject to impact for delivering gas developed by combustion of gas generating material through a conduit into an inflatable bag upon receipt of a firing commmand from an impact detector responsive to impact velocities of the vehicle greater than a predetermined value, the improvement comprising blocking means movably mounted adjacent said conduit and displacing means responsive to impact velocities of said vehicle greater than a second, predetermined higher value for selectively displacing said blocking means into said conduit so as to decrease the cross-sectional area of the conduit and partially block the flow of generated gas therethrough, whereby the burn time of said gas generating material is decreased and the mass flow rate of generated gas through the conduit is increased.

17. An apparatus for use in connection with a vehicle safety system utilizing an inflatable member, said apparatus including:

a. a propellant chamber having an outlet portion;
b. a propellant charge in said chamber;
c. outlet means for said chamber outlet portion having a predetermined effective area through which gases generated upon ignition of said propellant are expelled;
d. restricting means moveable from a first position unrestricting said outlet means to a second position at least partially restricting said outlet means;
e. first sensing means operative to cause ignition of said propellant to generate gases in said chamber which are expelled through said outlet means; and
f. second sensing means responsive to high level impact conditions operative to cause movement of said restricting means from said first position to said second position to increase the pressure in said chamber and hence the burning rate of the propellant to speed up deployment of the system.

* * * * *

UNITED STATES PATENT OFFICE
CERTIFICATE OF CORRECTION

Patent No. 3,985,375                    Dated October 12, 1976

Inventor(s) Donald J. Lewis et al.

It is certified that error appears in the above-identified patent and that said Letters Patent are hereby corrected as shown below:

Col. 1, line 32, "generatng" should be -- generating -- .

Col. 2, line 1, remove the "[" before "is" .

Col. 3, line 67, "in" should be -- is -- .

Col. 4, line 2, "theren" should be -- therein -- .

line 7, "Th" should be -- The -- .

line 47, "ground" should be -- grounded -- .

Col. 5, line 33, insert "of" after "be" .

Col. 6, line 1, "amy" should be -- may -- .

line 51, "an" should be -- and -- .

Col. 7, line 1, insert "depends" after "capacity" .

UNITED STATES PATENT OFFICE
CERTIFICATE OF CORRECTION

Patent No. 3,985,375     Dated October 12, 1976

Inventor(s) Donald J. Lewis et al.

It is certified that error appears in the above-identified patent and that said Letters Patent are hereby corrected as shown below:

Claim 6, Col. 9, lines 47-50, "f." and the material thereafter, should be out in the indented margin to be consistent with a. through e. and g.

Claim 13, Col. 10, line 42, "having" should be -- have -- .

Signed and Sealed this

Tenth Day of May 1977

[SEAL]

Attest:

RUTH C. MASON
Attesting Officer

C. MARSHALL DANN
Commissioner of Patents and Trademarks